United States Patent
Ohtomo et al.

(10) Patent No.: US 6,563,574 B2
(45) Date of Patent: May 13, 2003

(54) SURVEYING APPARATUS (75) Inventors: Fumio Ohtomo, Tokyo (JP); Kiwami Horiguchi, Tokyo (JP); Hitoshi Ohtani, Tokyo (JP)

(73) Assignee: Kabushiki Kaisha TOPCON (JP)

( * ) Notice: Subject to any disclaimer, the term of this patent is extended or adjusted under 35 U.S.C. 154(b) by 0 days.

(21) Appl. No.: 10/033,774

(22) Filed: Dec. 28, 2001

(65) Prior Publication Data
US 2002/0085193 A1 Jul. 4, 2002

(30) Foreign Application Priority Data
Dec. 28, 2000 (JP) .................................... 2000-403306

(51) Int. Cl.[7] ............................ G01C 3/08; G01C 1/00; G01B 11/26
(52) U.S. Cl. .................................. 356/141.1; 356/4.01
(58) Field of Search ........................ 250/203.1, 203.7, 250/206.17, 206.3, 208.1, 208.2; 342/54, 55; 348/135–147; 356/4.01, 3.01–5.15, 141.1, 139–140, 620; 702/150–153

(56) References Cited

U.S. PATENT DOCUMENTS

| 4,965,753 A | * 10/1990 | Kraemer | 345/421 |
|---|---|---|---|
| 5,055,666 A | * 10/1991 | Miyahara | 250/206.1 |
| 5,361,217 A | * 11/1994 | Makimura et al. | 356/3 |
| 6,137,569 A | * 10/2000 | Sasaki et al. | 356/138 |
| 6,151,017 A | * 11/2000 | Suzuoka et al. | 345/157 |
| 6,411,742 B1 | * 6/2002 | Peterson | 345/629 |

* cited by examiner

Primary Examiner—Thomas H. Tarcza
Assistant Examiner—Brian Andrea
(74) Attorney, Agent, or Firm—Baker Botts LLP (57) ABSTRACT

The present invention relates to both a surveying apparatus with a picking-up device and a electronic storage medium, and particularly to a surveying apparatus capable of combining a background image captured by a picking-up device with survey data obtained by the surveying apparatus and displaying the combined image on a display unit, wherein the surveying apparatus is configured such that the picking-up device can be connected to the surveying apparatus, the picking-up device having an optical axis approximately parallel with an optical axis of the surveying apparatus, the surveying apparatus comprising: an operation unit for associating measurement data obtained by the surveying apparatus with image data obtained by the picking-up device and displaying a measurement target position mark in the image data; a first storage unit for storing the measurement data associated with the image data; a second storage unit for storing the image data associated with the measurement data; and a display unit for, when necessary, displaying at least one of the measurement data and the image data stored in the first storage unit and the second storage unit, respectively.

8 Claims, 6 Drawing Sheets

SURVEYING APPARATUS

BACKGROUND OF THE INVENTION

The present invention relates to both a surveying apparatus with a picking-up device and an electronic storage medium, and particularly to a surveying apparatus capable of combining a background image captured by a picking-up device and survey data obtained by the survey device, and displaying the combined image on a display unit.

In survey work, a horizontal angle, an altitude angle, a distance, etc. of a target point is measured from a reference point. The measured data is used to calculate the location of the target point in a map. Surveying provides reference data for drafting of a work plan, site execution, construction work for a building, etc. It is necessary to obtain the geographic locations of lands owned by other people and existing buildings before carrying out any civil or construction work. Surveying is work for specifying these existing locations as well as planned ones.

For example, before carrying out civil or construction work at a target place, a survey of the place is conducted. Based on the survey data of the current conditions of the place, a work plan is drafted. After drafting the work plan, another survey is conducted to specify the location determined by the work plan. Site execution, construction of a building, etc. are performed according to the work plan and the survey results.

In most small-scale survey companies, the same person is responsible for surveying and drafting a work plan based on the survey results, acting as both a person in charge of surveying and a person in charge of work. In such a case, since the person in charge of work knows the site very well, the person can smoothly draft the plan. However, human memory tends to be ambiguous, causing a small discrepancy in some cases. This may lead to a delay of work or inappropriate work, sometimes raising a serious problem.

In many large-scale survey companies, on the other hand, surveying and drafting of a work plan are each carried out by a respective person in charge separately, considering the work efficiency. The person in charge of work prepares a work plan with reference to survey data, site pictures, etc. This division of work may cause a discrepancy between the understanding of the site by the person in charge of surveying and that by the person ire charge of work, imposing an unnecessary burden on site workers and thereby causing serious problems such as a large delay of work, execution of inappropriate work, and increased work cost.

SUMMARY OF THE INVENTION

A surveying apparatus according to the present invention is capable of combining a background image captured by a picking-up device and survey data obtained by the surveying apparatus and displaying the combined image on a display unit, wherein the surveying apparatus is configured such that the picking-up device can be connected to the surveying apparatus, the picking-up device having an optical axis approximately parallel with an optical axis of the surveying apparatus, the surveying apparatus comprising: an operation unit for associating measurement data obtained by the surveying apparatus with image data obtained by the picking-up data and displaying a measurement target position mark in the image data; a first storage unit for storing the measurement data associated with the image data; a second storage unit for storing the image data associated with the measurement data; and a display unit for, when necessary, displaying at least one of the measurement data and the image data stored in the first storage unit and the second storage unit, respectively.

BRIEF DESCRIPTION OF THE DRAWINGS

The following drawings show embodiments of the present invention.

DESCRIPTION OF THE INVENTION

Preferred embodiments of the present invention will be described with reference to the accompanying drawings.

First Embodiment

Figure 1:
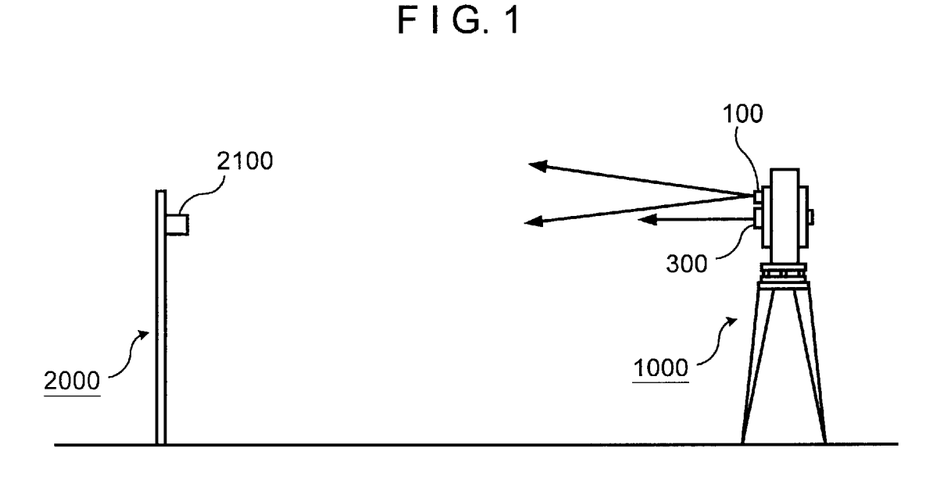
FIG. 1 is a diagram illustrating a surveying apparatus with a picking-up device according to a first embodiment of the present invention.

FIG. 1 shows a case in which a distance is measured using a distance measurement target 2000 and a surveying apparatus 1000 with a picking-up device 100. The picking-up device 100 is used to convert image device data into digital data. An example of the picking-up device 100 is an electronic camera such as a digital camera.

The surveying apparatus 1000 includes a distance measuring unit 300 for measuring the distance from a measurement target, and the picking-up device 100 is mounted above the distance measuring unit 300. The picking-up device 100 picks up an image by use of an image sensor such as a CCD. The picking-up device 100 may be incorporated in the surveying apparatus 1000 or it may be attached to the surveying apparatus 1000 afterward, that is, any picking-up device of type operable in combination with the surveying apparatus 1000 as a single unit can be used.

The collimation direction of the distance measuring light from the distance-measuring unit 300 is approximately in parallel with the collimation direction of the picking-up device 100 with a given interval spaced.

The distance measurement target 2000 has a reflection prism 2100 (retroreflection prism) at the position of its measurement target. If the reflection prism 2100 is not required, the distance of the measurement target is directly measured.

Figure 2:
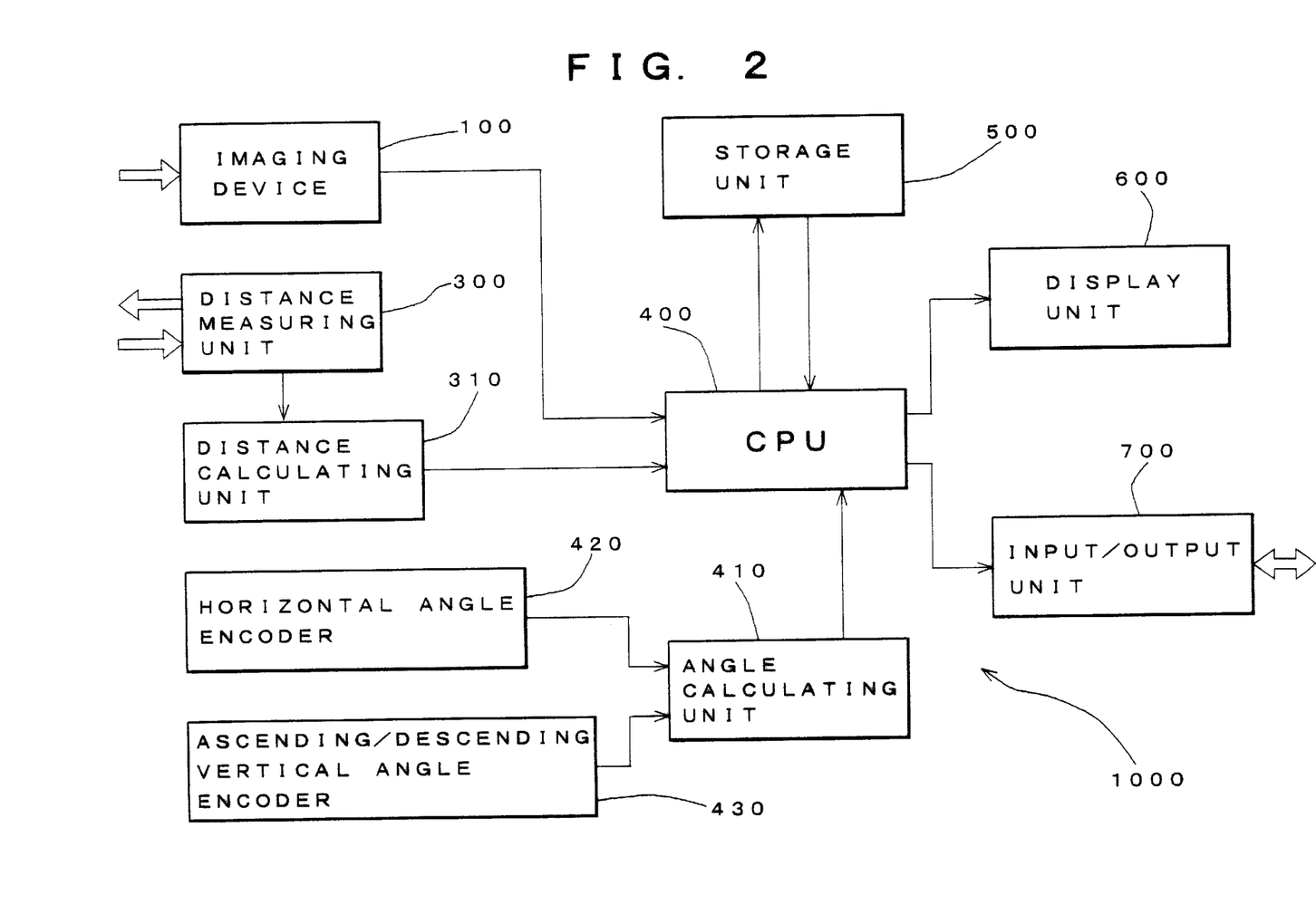
FIG. 2 is a diagram illustrating the electrical configuration of the surveying apparatus with the picking-up device according to the first embodiment of the present invention.

FIG. 2 is a diagram showing the electrical configuration of the surveying apparatus 1000 with the picking-up device 100.

The surveying apparatus 1000 with the picking-up device 100 comprises the picking-up device 100, the distance-measuring unit 300, a distance calculating unit 310, an operation unit (CPU) 400, an angle calculating unit 410, a horizontal angle encoder 420, an ascending/descending vertical angle encoder 430, a storage unit 500, a display unit 600, and an input/output unit 700.

The picking-up device 100 is used to capture the image of the distance measurement target 2000 and its background. The picking-up device 100 is of type capable of outputting digital data, and stores as information each pixel corresponding to one element of the image sensor, thereby making it possible to perform operation on the stored information.

The distance-measuring unit 300 emits a distance measuring light, and receives the reflected light from the target point 2000. The distance calculating unit 310 calculates the distance from the distance measurement target 2000 by use of the phase and time differences, etc. of the reflected light obtained by the distance measuring unit 300.

The angle-calculating unit 410 is used to calculate the horizontal and ascending/descending vertical angles, and the horizontal angle encoder 420 detects the amount of horizontal rotation from a reference direction to the collimation direction of the distance-measuring unit 300.

Similarly, the ascending/descending vertical angle encoder 430 detects the amount of ascending/descending vertical rotation from the horizontal direction or the zenith to the collimation direction of the distance-measuring unit 300.

The angle-calculating unit 410 calculates the horizontal angle and the ascending/descending vertical angle by use of the amount of horizontal rotation and the amount of ascending/descending vertical rotation detected by the horizontal angle encoder 420 and the ascending/descending vertical angle encoder 430, respectively.

The storage unit 500 stores basic programs for controlling the entire surveying apparatus 1000 with the picking-up device 100 as well as image data obtained from the picking-up device 100 and distance measurement data, data of horizontal and ascending/descending vertical angles, etc. obtained from the distance measuring unit 300.

The basic programs include basic programs for data indication, etc. for the surveying apparatus 1000, a data processing program, and a data input/output program.

The display unit 600 displays angle data, distance data, etc. and uses a liquid crystal display. To display image data, it is necessary to employ a black and white liquid crystal display or a color liquid crystal display capable of expressing shades of gray, or any display means having higher display quality.

The input/output unit 700 is designed to output data stored in the storage unit 500, and receive data from a computer, a survey program, etc.

Figure 3:
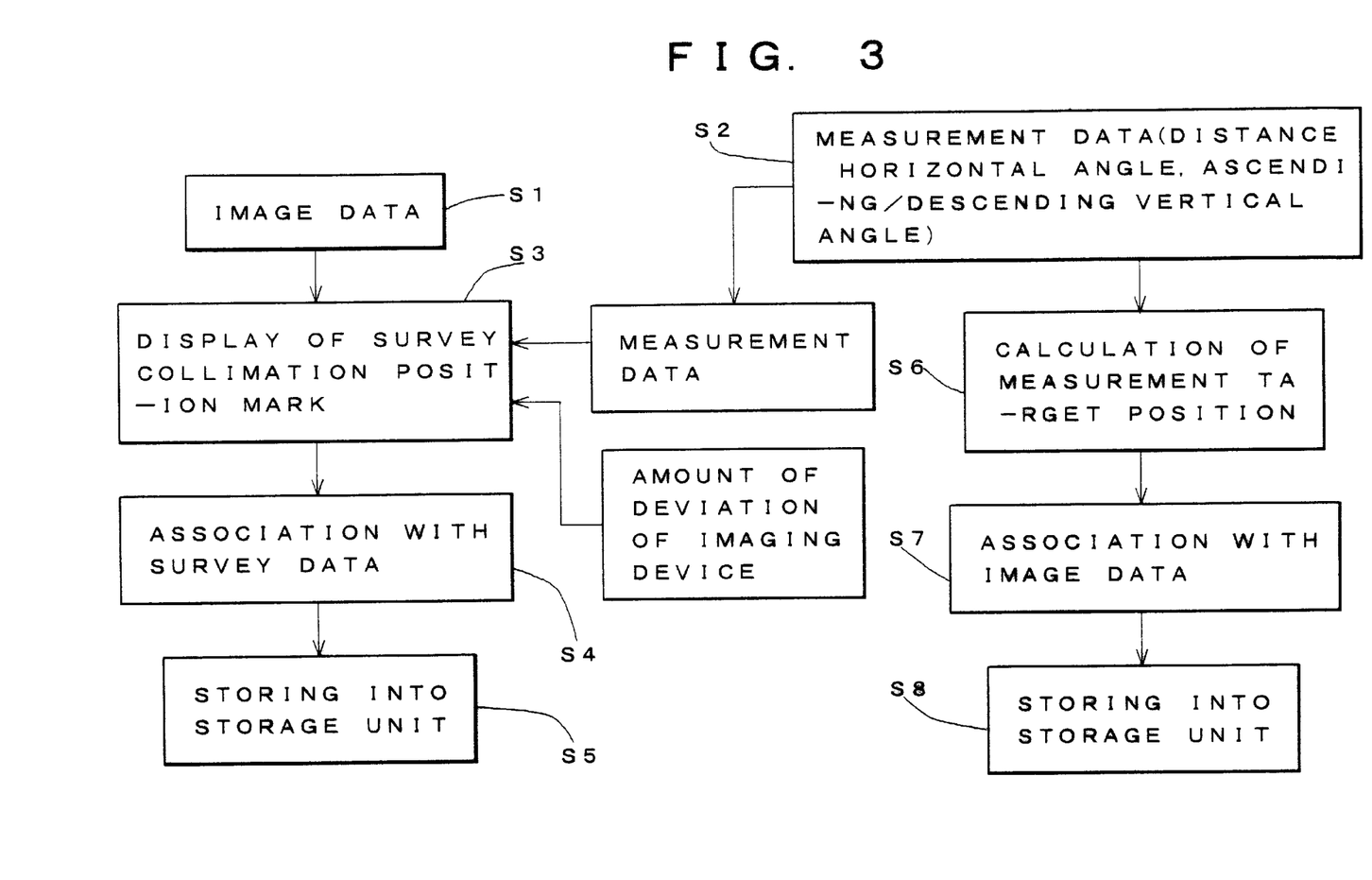
FIG. 3 is a diagram illustrating the operation of the surveying apparatus with the picking-up device according to the first embodiment of the present invention.

FIG. 3 is a flowchart of the processing of image data and survey data.

At step 1 (each step is hereinafter referred to by its shortened form such as "S1" for step 1, "S2" for step 2, and so on), the picking-up device 100 obtains image data. At S2, the distance-measuring unit 300 emits a distance measuring light and receives the reflected light from the distance measurement target 2000. The phase and time differences, etc. of the reflected light are used to calculate the distance of the distance measurement target 2000. Furthermore, the angle-calculating unit 4 calculates the horizontal angle and the ascending/descending vertical angle at S2.

Next, S3 (step 3) sends the image data obtained at S1, the distance data obtained at S2, the amount of deviation in the collimation (parallel deviation amount) of the picking-up device, etc. to the operation unit (CPU) 400 so that a mark indicating the survey collimation position is displayed in the image (data) based on the deviation amount of the collimation of the picking-up device from the distance measurement data included in the survey data.

At S4, the operation unit CPU 400 calculates how many pixels the distance measurement target 2000 is apart from the collimation position of the picking-up device 100 based on the distance of the distance measurement target 2000 and the deviation amount. That is, the coordinates X and Y on the X coordinate axis and Y coordinate axis corresponding to the position of the distance measurement target 200 are determined. Then, S5 stores the data calculated at S4 into a second storage unit 520 as well as selectively displaying the data on the display unit 600.

S6 calculates the position of the survey target 2000 from the survey data obtained at S2. Furthermore, S7 determines the corresponding relationship between the image data obtained at S1 and the position (the X and the Y coordinates on the X and the X axes) of the survey target 2000 obtained at S6.

S8 stores the data calculated at S7 into a first storage unit 510 as well as displaying the data on the display unit 600.

It should be noted that the storage unit 500 comprises the first storage unit 510 and the second storage unit 520.

Methods of using the present invention will be described below.

Figure 4:
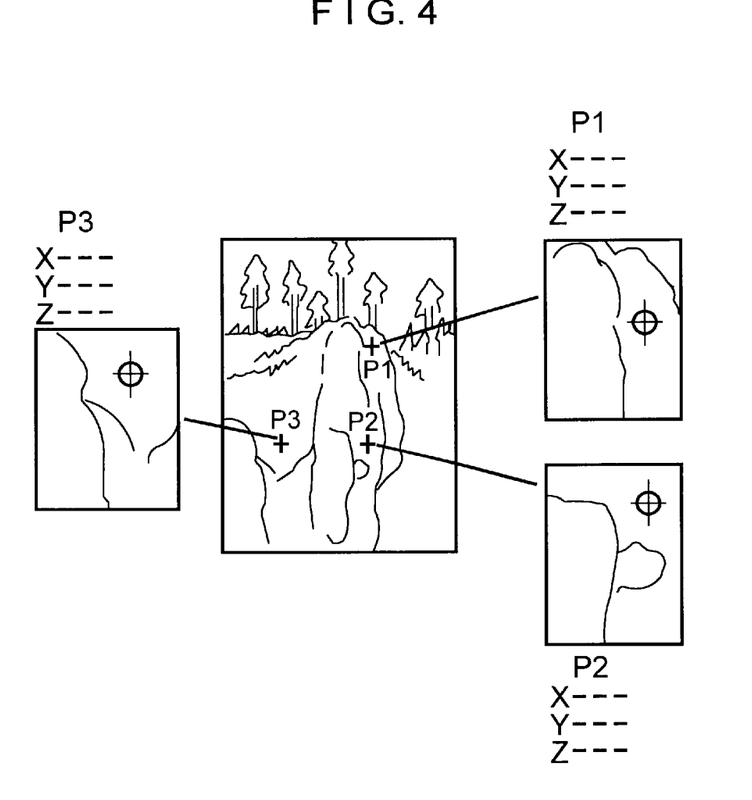
FIG. 4 is a diagram illustrating a method for using the surveying apparatus with the picking-up device according to the first embodiment of the present invention.

FIG. 4 shows a prism-less system in which the survey target 2000 does not use the reflection prism 2100 (retroreflection prism). In the present embodiment, a case is shown where the survey target 2000 is a dangerous cliff. The picking-up device 100 captures the background image in which the points P1, P2, and P3 on the survey target 2000 are indicated by cross-hair marks, and their three-dimensional coordinates (x, Y, Z) are also indicated. It should be noted that each cross-hair mark corresponds to a measurement target position mark.

As described above, the operation unit (CPU) 400 calculates the three-dimensional coordinates of the survey target 2000 by use of the data obtained from the distance calculating unit 310 and the angle calculating unit 410 and obtains how many pixels the survey target 2000 is apart from the collimation position of the picking-up device 100 to indicate the position of the survey target 2000 as a cross-hair mark. Thus, it is possible to display the survey target 2000 together with its background image.

Furthermore, the portions of the background behind the points P1, P2, and P3 on the survey target 2000 can be enlarged on the display.

Figure 5:
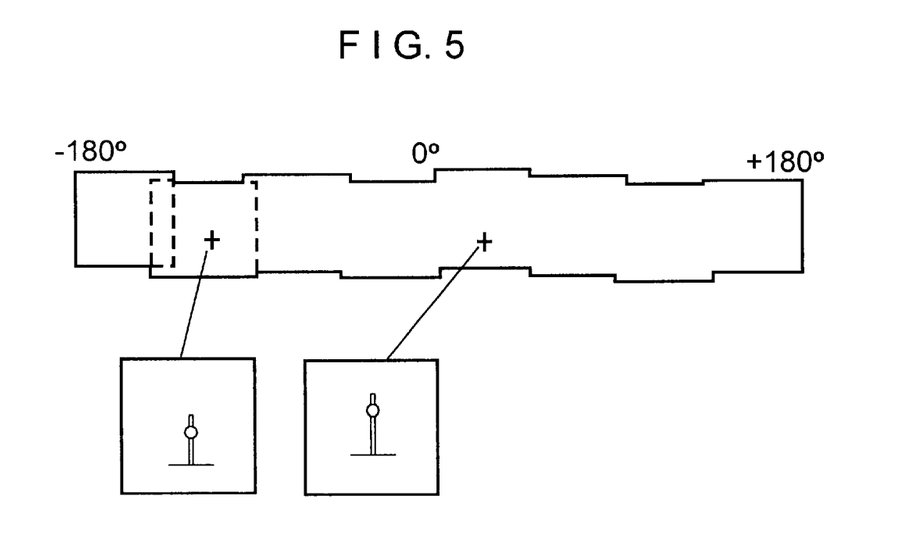
FIG. 5 is a diagram illustrating another method for using the surveying apparatus with the picking-up device according to the first embodiment of the present invention.

FIG. 5 shows a case in which the surveying apparatus 1000 with the picking-up device 100 is intermittently rotated horizontally so that the picking-up device 100 captures a plurality of images. By horizontally aligning these images, a panorama-like 360-degree encircling image (from +180° to −180°) can be produced. It is possible to set and measure another survey target 2000, and display another survey target 2000 together with its background image using this produced panorama-like image.

With this, it is possible to set the survey target 2000 in all directions (panorama-like arrangement from +180° to −180°) on a horizontal plane.

Incidentally, when the above plurality of images are simultaneously displayed at intervals determined based on the survey data by use of the measurement data and image data obtained by the surveying apparatus 1000 with the picking-up device 100, only one image may be used in the overlapped portion of each two adjacent images to create the panorama-like 360-degree encircling image.

Figure 6:
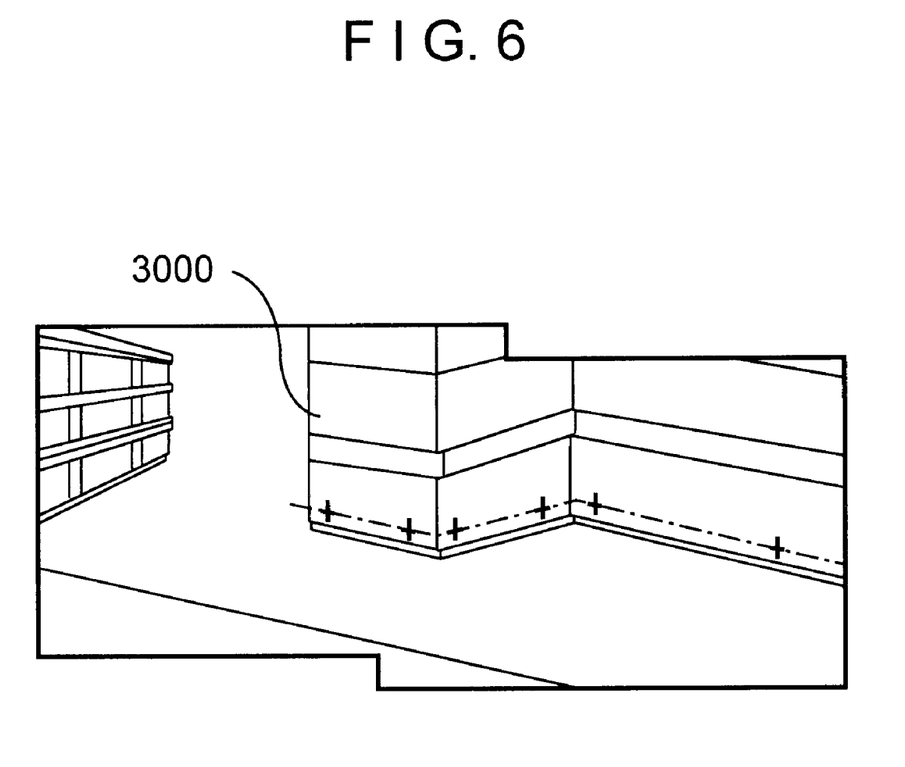
FIG. 6 is a diagram illustrating still another method for using the surveying apparatus with the picking-up device according to the first embodiment of the present invention.

In FIG. 6, the picking-up device 100 captures a background image for which a plurality of survey targets 2000 is set. These survey targets 2000 are set and displayed along a continuous line. Specifically in FIG. 6, the continuous line is formed by connecting points having a specific height in a building 3000.

By selecting one of the cross-hair marks (measurement target position marks) indicated in the continuous image, it is possible to display the corresponding enlarged background image (image data) by use of the image device 100.

It should be noted that a separate display operation device may be provided such that: when measurement data (the three-dimensional coordinates X, Y, and Z of the survey target 2000) is displayed, image data associated with the survey data is selectively displayed; and when image data is displayed, the image data itself or measurement data associated with a cross-hair mark (measurement target position mark) indicated in the image is selectively displayed.

Second Embodiment

Figure 7:
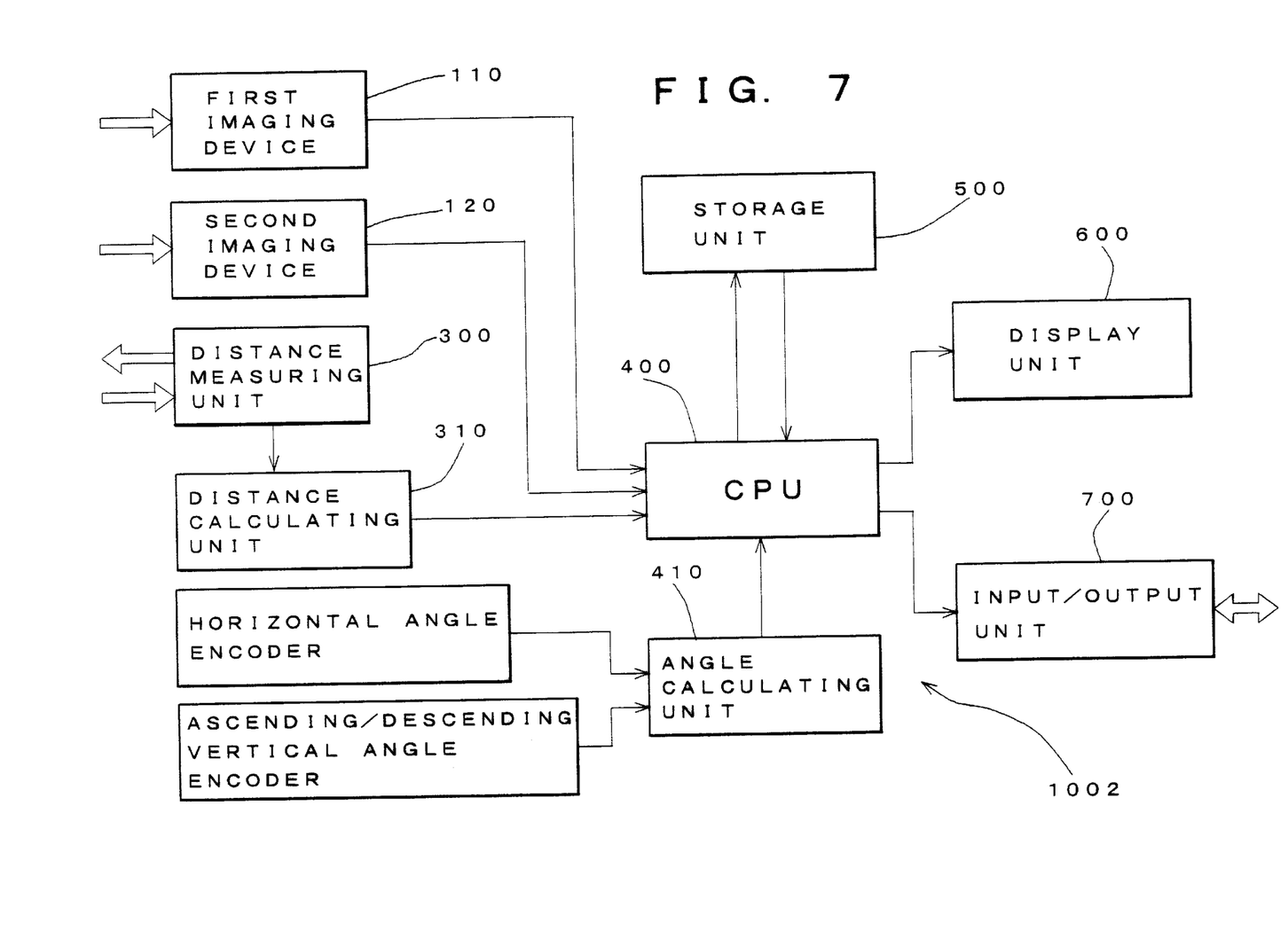
FIG. 7 is a diagram illustrating the electrical configuration of a surveying apparatus with a picking-up device according to a second embodiment of the present invention.

A surveying apparatus 1002 with a picking-up device 100 according to a second embodiment of the present invention comprises a first picking-up device 110, a second picking-up device 120, a distance measuring unit 300, a distance calculating unit 310, an operation unit (CPU) 400, an angle calculating unit 410, a horizontal angle encoder 420, an ascending/descending vertical angle encoder 430, a storage unit 500, a display unit 600, and an input/output unit 700.

The first picking-up device 110 telescopically captures an image in a direction parallel with the collimation direction of the surveying apparatus 1002.

The second picking-up device 120 captures an image of a wide photographing range including the photographing range of the first picking-up device 110.

The collimation directions of the first picking-up device 110, the second picking-up device 120, and the surveying apparatus 1002 are in parallel one another.

Measurement data obtained by the surveying apparatus 1002 can be associated with image data obtained by the first picking-up device 110 and the second picking-up device 120. In addition, cross-hair marks (measurement target position marks) can be indicated in the image (data).

Further, the first storage unit 510 is designed to store the measurement data associated with the image data while the second storage unit 520 is designed to store the image data associated with the measurement data. With this arrangement, the measurement data and/or image data stored in the first storage unit 510 and the second storage unit 520 can be displayed on the display unit as necessary.

It should be noted that the first picking-up device 110 may form a coaxial optical system with the distance measuring optical system of the surveying apparatus 1002. Since the distance measuring light is generally invisible light, a dichroic prism, which separates one wavelength band from the other, is used to separate the invisible light from the visible light so as to be able to form the coaxial optical system. If this optical system has a collimation optical system and a distance measuring optical system, a half mirror is used to separate the distance measuring light by use of a dichroic prism, and supply it to the picking-up device.

Furthermore, the image data obtained by the first picking-up device 110 and the image data obtained by the second picking-up device 120 are associated with each other by both the measurement data and the cross-hair marks (target position marks) so that the image data obtained by the first picking-up device 110 can be easily displayed as an enlarged image using a cross-hair mark (target position mark) attached to the image data obtained by the second picking-up device 120.

Thus, according to the second embodiment, by selecting a cross-hair mark (target position mark) of the image data obtained by the second picking-up device 120, it is possible to display the corresponding image (data) obtained by the first picking-up device 110. Furthermore, the image data obtained by the first picking-up device 110 and the image data obtained by the second picking-up device 120 can be associated with each other by both the measurement data and the cross-hair marks (target position marks).

With this arrangement, it is possible to obtain a clearer image by enlarging an image of digital data, increasing the number of applications to which the image data can be applied.

It should be noted that since-the other configurations and effects of the second embodiment are the same as those of the first embodiment, their explanation will be omitted.

Further, there may be provided an electronic storage medium such as an FD, a CD, a DVD, a RAM, a ROM, or a memory card, storing a program which specifies a procedure for: causing the operation unit (CPU) 400 to associate measurement data obtained by the surveying apparatus 1000 having the picking-up device 100 with image data obtained by the picking-up device 100 having an optical axis approximately parallel with an optical axis of the surveying apparatus 1000 and display a cross-hair mark (a measurement target position mark) in the image data, the measurement data including a distance, a horizontal angle, and an altitude angle of the measurement target 2000; causing the first storage unit 510 to store the measurement data associated with the image data; causing the second storage unit 520 to store the image data associated with the measurement data; and causing the display unit 600 to, when necessary, display at least one of the measurement data and the image data stored in the first storage unit 510 and the second storage unit 520, respectively. It should be noted that any electronic storage medium can be used as the above electronic storage medium as long as it can store a program for controlling the operation unit (CPU) 400, etc.

Configured as described above, a surveying apparatus according to the present invention measures a distance, a horizontal angle, and an altitude angle of a measurement target by use of reflected light, wherein the surveying apparatus is configured such that a picking-up device can be connected to the surveying apparatus, the picking-up device having an optical axis approximately parallel with an optical axis of the surveying apparatus, the surveying apparatus comprising: an operation unit for associating measurement data obtained by the surveying apparatus with image data obtained by the picking-up device and displaying a measurement target position mark in the image data; a first storage unit for storing the measurement data associated with the image data; a second storage unit for storing the image data associated with the measurement data; and a display unit for, when necessary, displaying at least one of the measurement data and the image data stored in the first storage unit and the second storage unit, respectively. Thus, the present invention can display both a measurement target position mark and measurement data in image data, resulting in efficient survey work with superb effect.

Furthermore, it is not necessary to draft a work plan while referring to survey data, site pictures, etc., eliminating occurrence of a discrepancy at site and preventing delay of work and execution of inappropriate work, etc.

What is claimed is:

1. A surveying apparatus for measuring a distance, a horizontal angle, and an altitude angle of a measurement target by use of reflected light, said surveying apparatus comprising:

a picking-up device capable of being connected to said surveying apparatus, said picking-up device having an optical axis approximately parallel with an optical axis of said surveying apparatus;

an operation unit for associating measurement data obtained by said surveying apparatus with image data obtained by said picking-up device, and displaying a measurement target position mark in said image data;

a first storage unit for storing said measurement data associated with said image data;

a second storage unit for storing said image data associated with said measurement data; and a display unit for, when necessary, displaying at least one of said measurement data and said image data stored in said first storage unit and said second storage unit, respectively.

2. A surveying apparatus for measuring a distance, a horizontal angle, and an altitude angle of a measurement target by use of reflected light, said surveying apparatus comprising:

a first picking-up device for capturing an image in a collimation direction of said surveying apparatus;

a second picking-up device for capturing an image in a wide photographing range including a photographing range of said first picking-up device;

an operation unit for associating measurement data obtained by said surveying apparatus with image data obtained by said first picking-up device and said second picking-up device, and displaying a measurement target position mark in said image data;

a first storage unit for storing said measurement data associated with said image data;

a second storage unit for storing said image data associated with said measurement data; and a display unit for, when necessary, displaying at least one of said measurement data and said image data stored in said first storage unit and said second storage unit, respectively.

3. The surveying apparatus according to claim 1 or 2, wherein said surveying apparatus is provided with a separate display operation device for, based on said measurement data and image data obtained by said surveying apparatus, operating such that, when said measurement data is displayed, said image data associated with said measurement data is selectively displayed; and when said image data is displayed, said image data or said measurement data associated with said measurement target position mark displayed in said image is selectively displayed.

4. The surveying apparatus according to any one of claims 1 to 2, wherein based on said measurement data and image data obtained by said surveying apparatus, said surveying apparatus displays a plurality of pieces of said image data at the same time at intervals determined based on survey data, displaying only one piece of said image data in an overlapped portion of each two adjacent pieces of said image data to produce a single continuous image.

5. The surveying apparatus according to claim 4, wherein selecting a measurement target position mark indicated in said continuous image displays image data associated with said measurement target position mark.

6. The surveying apparatus according to claim 2, wherein selecting a target position mark of said image data obtained by said second picking-up device displays associated image data obtained by said first picking-up device.

7. The surveying apparatus according to claim 2, wherein said image data obtained by said first picking-up device and said image data obtained by said second picking-up device are associated with each other by both said measurement data and a target position mark.

8. An electronic storage medium including an FD, a CD, a DVD, a RAM, a ROM, or a memory card, storing a program which specifies a procedure for:

causing an operation unit to associate measurement data obtained by a surveying apparatus with image data obtained by a picking-up device having an optical axis approximately parallel with an optical axis of said surveying apparatus and display a measurement target position mark in said image data, said measurement data including a distance, a horizontal angle, and an-altitude angle of a measurement target;

causing a first storage unit to store said measurement data associated with said image data;

causing a second storage unit to store said image data associated with said measurement data; and causing a display unit to, when necessary, display at least one of said measurement data and said image data stored in said first storage unit and said second storage unit, respectively.

* * * * *